Dec. 22, 1970    D. R. HERRIOTT    3,550,039
OPTICAL DELAY SYSTEM
Filed Dec. 19, 1967
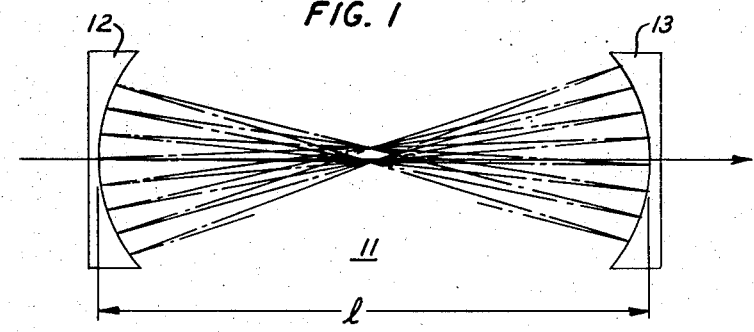
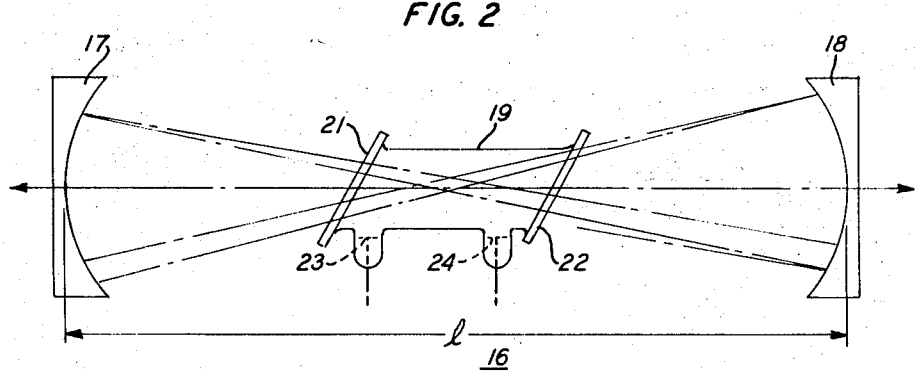
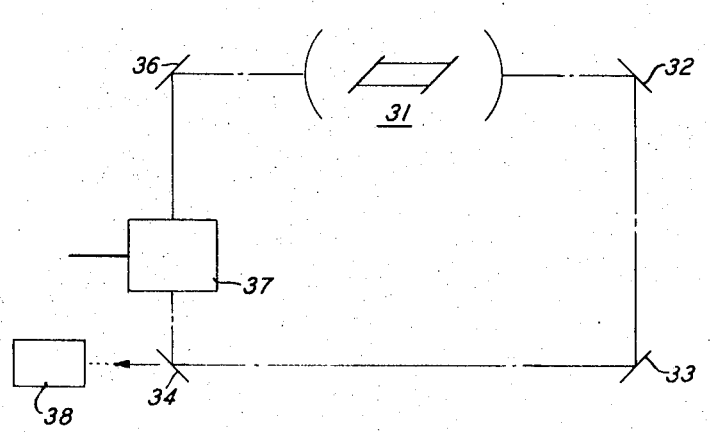
INVENTOR
D. R. HERRIOTT
BY
ATTORNEY : 3,550,039
Patented Dec. 22, 1970

3,550,039
OPTICAL DELAY SYSTEM
Donald R. Herriott, Morris Township, Morris County,
N.J., assignor to Bell Telephone Laboratories, Incorporated, Murray Hill, N.J., a corporation of New York
Filed Dec. 19, 1967, Ser. No. 691,750
Int. Cl. H01s 3/10
U.S. Cl. 332—7.51                                       7 Claims

ABSTRACT OF THE DISCLOSURE

An optical delay line and information storage comprises a pair of spherical mirrors spaced apart a distance slightly less than the sum of their radii. An optical amplifier device is located in the space between the two mirrors and means are included for causing light rays to trace a plurality of different paths between the two mirrors, all of which pass through the amplifying device. Information storage is achieved by including a light feedback loop from the output to the input of the mirror system, and modulating the light in the loop with signals to be stored.

BACKGROUND OF THE INVENTION

This invention relates to optical delay lines and more particularly to such delay lines adapted for use in information storage and processing.

In copending United States application Ser. No. 444,307, filed Mar. 31, 1965, of D. R. Herriott and H. J. Schulte, Jr., now U.S. Pat. No. 3,437,954, there is disclosed an optical delay line comprising a pair of spaced reflecting members forming a cavity into which a light beam is introduced. The light is made to undergo numerous reflections by means of either an additional reflecting element in the resonator or an aberration on one of the reflecting surfaces. In the absence of the aberration, the light would trace a simple ellipsoidal pattern of reflection points on the reflecting surfaces, whereas with the aberration, e.g., astigmatism, the light traces a Lissajous pattern of reflection points. Such an arrangement produces, for example, 1400 round trips of the light beam, and a delay of the order of 20 microseconds.

Such optical delay lines are attractive for a number of reasons, chief of which are their nondispersive nature and their wideband characteristics. In particular, the wideband characteristic makes possible high speed operation, which, in turn, makes the delay line attractive for use in information storage and retrieval systems.

SUMMARY OF THE INVENTION

The present invention utilizes the delay line of the aforementioned Herriott et al. application to achieve information storage for times in the millisecond range.

In an illustrative embodiment of the invention, a pair of spherical mirrors spaced apart a distance slightly less than the sum of their radii form a delay line of the type disclosed in the aforementioned Herriott et al. application. Located between the mirrors is an active laser element, such as, for example, a helium-neon laser tube. The nearly concentric spacing of the reflecting members causes all of the delay line beam paths to pass through a narrow waist centrally located between the mirrors. With the optical amplifier located at this narrow waist, all of the delay line beam paths pass therethrough, and the light beam in each path is amplified, thereby overcoming reflection and diffraction losses in the system. The laser element is preferably supplied with Brewster angle windows. The aberration required for the delay line may be the astigmatism inherent in the Brewster windows, rather than in one of the reflectors, if desired.

In one embodiment of the invention, the output of the delay line is fed back to the input, thereby forming a ring laser with an equivalent path length of several thousand meters.

In another embodiment of the invention, a modulator is inserted in the feedback loop, and pulses to be stored are applied to the circulating beam, in the form of either light or dark pulses, or both. Digital pulse trains can be stored so long as the pulse train length occupies a period less than the time for one complete delay loop. When the loop gain of the system is approximately one, delays of milliseconds can be achieved. The stored information can be retrieved by making one of the mirrors in the loop partially transmissive and placing suitable detecting means at that mirror, for example.

In a variation of the storage arrangement, the modulator can be synchronized with the pulse train to replace the oldest pulse in the train by a new pulse, i.e., stroboscopic modulation. Such an arrangement is useful in such systems as underwater sound ranging and locating, as will be discussed more fully hereinafter.

In all of the embodiments of the invention, the basic building block is a delay line having a laser amplifier tube incorporated therein. The unique advantages of such a device will be more fully understood from the following detailed description and drawings.

DESCRIPTION OF THE DRAWINGS

FIG. 1 is a digrammatic view of the behavior of light rays in a nearly confocal delay line;

FIG. 2 is a digrammatic view of the delay line of the present invention;

FIG. 3 is a view of an information storage system utilizing the principles of the present invention; and FIG. 4 is a partial view of the arrangement of FIG. 3 showing a modification of that arrangement.

DETAILED DESCRIPTION

In FIG. 1 there is shown a passive delay line 11 comprising a pair of spherical mirrors 12, 13 of radii $r_1$ and $r_2$, respectively, spaced apart a distance $l$ which is slightly less than the sum of $r_1$ and $r_2$. With one or both of the mirrors having an aberration, as called for in the aforementioned Herriott-Schulte application and with the spacing illustrated in FIG. 1, a light beam traces the ray paths shown by the dash-dot lines. As can be seen all of the rays pass through a centrally located "waist" defining a high density bundle of light rays.

FIG. 2 depicts the optical delay line 16 of the present invention, comprising spherical mirrors 17 and 18, spaced apart the distance $l$, as in FIG. 1. Located in the region of the waist is a laser member 19 which may be, for example, a helium-neon tube terminated in Brewster angle windows 21 and 22. The laser is pumped by means of electrodes 23 and 24, connected to a suitable power source, not shown, to establish a discharge in the gas mixture in the tube. It is to be understood that other suitable pumping arrangements, as well as other types of lasers, may readily be used. Inasmuch as the Brewster windows are inherently astigmatic, it is not necessary to grind the mirrors to give them a cylindrical component since the windows can supply the necessary astigmatism.

In operation, the delay line 16 acts as a laser many hundreds of meters long, the beam making as many as three thousand passes through the tube 19 before exiting from a suitably located hole or transparent area in either one of mirrors 17, 18. Thus the arrangement 16 can be used as a long laser, or, where a beam is introduced into the system in accordance with the teaching in the Herriott-Schulte application, as an active delay line in which reflection and diffraction losses are overcome by the gain produced by tube 19. Thus considerable delays can be achieved with substantially no loss of signal amplitude and if desired an increase in signal amplitude. Preferably the tube 19 should exhibit enough gain so that there is no net loss for one complete round trip of the beam in the delay line. One round trip includes one pass in each direction through the tube, one reflection at each mirror, and two passes through each of the windows 21 and 22. For a system where the loss per mirror was between two-tenths and three-tenths percent, the minimum gain required was approximately one-half percent.

A complete storage system utilizing the active delay line of FIG. 2 is shown schematically in FIG. 3.

The arrangement of FIG. 3 comprises an active delay line 31 of the type shown in FIG. 2, and a set of mirrors 32, 33, 34, and 36 which define a closed loop. A light modulating member 37, which may take any one of a number of suitable forms known in the art, such as, for example, a KDP modulator, is inserted in one leg of the ring. In the absence of the modulator, the arrangement functions as a ring laser several hundreds of meters long with a narrow spectral width. With such a ring laser, for a four hundred dot reflection pattern on the mirrors, external losses can be of the order of ten db and oscillation still occurs.

A useful storage system should be able to reproduce stored information nondestructively, with minimum distortion, for arbitrarily long periods of time. The arrangement of FIG. 3 is especially useful as a PCM (pulse code modulation) storage system. Pulses applied to modulator 37 are impressed on the beam, in the form of either light or "dark" pulses. An entire pulse train may be stored so long as the period of the pulse train is less than the period of one passage of the light beam through the system, which may be as much as twenty microseconds. Because of the regeneration in the system, total storage times for the PCM signal have been as great as three milliseconds. The stored signal may be read out, for example, by making one of the mirrors partially transparent and placing a suitable detector 38 behind the mirror. While the modulator has been discussed in terms of electro-optic modulation, it may also take the form of a light gate for introducing light energy from a separate laser source.

The arrangement of FIG. 3 can be made to store a continuously varying signal when the modulator is synchronized with the pulses on the light beam so that the oldest, or some other, pulse is replaced by a new pulse on each complete circuit of the light beam. This stroboscopic modulation makes possible a variety of applications. For example, in an underwater sound locating system a pair of delay loops can be used, where one loop has a delay one bit or sample longer than the other loop. Sound waves impinging on geophones connected to each loop are used to modulate the light beams in each loop stroboscopically, and the outputs of the two loops are combined. Where signals overlap, the output of the combiner is highest in amplitude, and the location of this peak in the output when applied to an oscilloscope, gives the angular displacement of the sound source from the geophones.

It is also possible to use more than one modulator per loop as well as more than one readout per loop. The relative phase differences of the readout signals can give various information, as in multiplying signals, for example.

In the arrangements of FIGS. 2 and 3, the gain of the laser tube when greater than unity produces oscillations. However, because the entrance and exit apertures represent high losses to such oscillations, there is no oscillation in the delay line mode. If the apertures are located at a point common to all modes within the delay line, then oscillation ceases entirely. Thus it is possible to have a gain of approximately 0.4% per beam pass through the laser tube and yet attain gains of over one hundred without oscillation. It is also possible, where necessary, to place an amplifier in the external loop, especially if greater gains are required.

In one physical embodiment of the invention, the laser tube contained a helium-neon gas mixture producing an output at 6328 A. The mirrors were of one meter radius, five inches in diameter, and spaced 1.9 meters apart. Each mirror had a centrally located aperture approximately 0.150 inch in diameter. The reflectance of the mirrors was between 99.85% and 99.97%. The laser tube itself was eighteen inches between windows with a discharge length of approximately thirteen inches. The average gain per pass for the tube approximately 0.6%. With such an arrangement, patterns of from 200 to 1400 dots were obtained, representing delays of from 2.7 to 19 μsec. by adjustment of the mirrors. When placed in the storage system of FIG. 3, where KDP crystals were used for modulation, delays of up to 3 ms. were achieved by reducing the gain per pass of the laser tube.

The storage arrangement of FIG. 3 may be modified to produce propagation in one direction only through the loop by utilizing a beam splitter in one of the legs of the ring as shown in FIG. 4. In the arrangement of FIG. 4, mirror 32 is made somewhat more transparent than usual. Light traveling in the clockwise direction is partially reflected and partially transmitted by mirror 32, the transmitted portion either being lost or utilized as desired. Light traveling in the counterclockwise direction also is partially transmitted through mirror 32, but is reflected back by a planar mirror 41, passed through mirror 32 and is added to the clockwise traveling light. As a consequence, there is a greater loss of light energy in the counterclockwise direction than in the clockwise direction, and the system locks in the clockwise mode.

The foregoing has been intended to illustrate the principles of the present invention. Numerous applications of these principles may occur to workers in the art without departing from the spirit and scope of the invention.

What is claimed is:

1. An optical delay device comprising first and second substantially spherical reflectors spaced apart a distance different than the sum of their radii, means within said region defined by said reflectors for causing a light beam within said region to follow a plurality of different paths and produce a varying pattern on said reflectors, the spacing of said reflectors being such as to cause all of said paths to pass through a narrow waist centrally located between the reflectors, light amplifying means located at the narrow waist between the reflectors, and means for extracting a light beam from said region.

2. An optical delay device as claimed in claim 1 wherein said means for causing a light beam to follow a plurality of paths comprises an aberration on at least one of said reflectors.

3. An optical delay device as claimed in claim 1 wherein said light amplifying means is terminated at either end by Brewster angle windows, and the means for causing the light beam to follow a plurality of paths comprises astigmatism in said windows.

4. An optical delay device as claimed in claim 1 and further including means defining an external feedback path for returning light energy extracted from said region back to said region.

5. The arrangement as claimed in claim 4 and including means in said feedback path for modulating the light energy in said path.

6. The arrangement as claimed in claim 5 wherein said modulating means comprises means for introducing light energy into said path.

7. An optical delay device comprising first and second substantially spherical reflectors spaced apart a distance slightly less than the sum of their radii, means within said region defined by said reflectors for causing a light beam within said region to follow a plurality of different paths and produce a varying pattern on said reflectors, the spacing of said reflectors being such as to cause all of said paths to pass through a narrow waist centrally located between the reflectors, light amplifying means located at the narrow waist between the reflectors, and means for extracting a light beam from said region.

References Cited
UNITED STATES PATENTS

| | | | |
|---|---|---|---|
| 3,253,226 | 5/1966 | Herriott et al. | 331—94.5 |
| 3,321,714 | 5/1967 | Tien | 331—94.5 |
| 3,403,348 | 9/1968 | Ashkin et al. | 331—94.5 |
| 3,437,945 | 4/1969 | Herriott et al. | 331—94.5 |

JOHN KOMINSKI, Primary Examiner

D. R. HOSTETTER, Assistant Examiner

U.S. Cl. X.R.

330—4.3; 331—94.5; 350—160